United States Patent [19]
Morris

[11] Patent Number: 6,137,256
[45] Date of Patent: Oct. 24, 2000

[54] SOFT TURN-OFF CONTROLLER FOR SWITCHED RELUCTANCE MACHINES

[75] Inventor: David J. Morris, Novelty, Ohio

[73] Assignee: Tridelta Industries, Inc., Mentor, Ohio

[21] Appl. No.: 09/189,019

[22] Filed: Nov. 10, 1998

[51] Int. Cl.[7] .................................................. H02K 29/02
[52] U.S. Cl. ...................... 318/701; 318/685; 318/138
[58] Field of Search ..................................... 318/138, 245, 318/256, 439, 701, 727, 757; 363/20, 16, 61, 124; 323/285, 351

[56] References Cited

U.S. PATENT DOCUMENTS

| | | | |
|---|---|---|---|
| Re. 35,189 | 3/1996 | Müeller | 318/254 |
| 3,742,330 | 6/1973 | Hodges et al. | 321/9 A |
| 4,074,179 | 2/1978 | Kuo et al. | 318/696 |
| 4,127,801 | 11/1978 | Leenhouts | 318/696 |
| 4,208,623 | 6/1980 | Leenhouts | 318/696 |
| 4,295,083 | 10/1981 | Leenhouts | 318/696 |
| 4,496,886 | 1/1985 | Gordon et al. | 318/254 |
| 4,500,824 | 2/1985 | Miller | 318/701 |
| 4,570,212 | 2/1986 | Edwards et al. | 363/138 |
| 4,620,138 | 10/1986 | Müller | 318/254 |
| 4,682,093 | 7/1987 | Murphy et al. | 318/701 |
| 4,763,056 | 8/1988 | Byrne et al. | 318/701 |
| 4,783,795 | 11/1988 | Yahata | 378/105 |
| 5,075,610 | 12/1991 | Harris | 318/701 |
| 5,084,662 | 1/1992 | Palaniappan et al. | 318/701 |
| 5,144,215 | 9/1992 | Bahn | 318/701 |
| 5,252,907 | 10/1993 | Harris et al. | 318/727 |
| 5,327,069 | 7/1994 | Radun et al. | 322/10 |
| 5,406,184 | 4/1995 | Bahn | 318/701 |
| 5,446,359 | 8/1995 | Horst | 318/701 |
| 5,485,047 | 1/1996 | Bahn | 318/701 |
| 5,530,333 | 6/1996 | Turner | 318/701 |
| 5,589,752 | 12/1996 | Iwasaki et al. | 318/701 |
| 5,703,457 | 12/1997 | Davis | 318/701 |
| 5,754,041 | 5/1998 | Kaito et al. | 324/158.1 |
| 5,767,638 | 6/1998 | Wu et al. | 318/254 |
| 5,814,965 | 9/1998 | Randall | 318/701 |

FOREIGN PATENT DOCUMENTS

| | | | |
|---|---|---|---|
| 797047 | 1/1981 | Russian Federation | H02P 7/36 |
| 0 208 456 | 3/1989 | United Kingdom | H02P 6/028 |

OTHER PUBLICATIONS

"Saturation in doubly salient reluctance motors", by J.M. Stephenson and M.A. El–Khazendar, IEE Proceedings, vol. 136, pp. 50–58, Jan. 1989.

"Power convertor circuits for switched reluctance motors with the minimum number of switches", by C. Pollock and Prof. B.W. Williams, IEE Proceedings, vol. 137, pp. 373–384, Nov. 1990.

"Brushless reluctance—motor drives", by Tim Miller, IEE Proceedings, 1987.

"Computer Aided Design of Electrical Machines for Variable Speed Applications", by R. Krishnan, S. Aravind and P. Materu, *IECON '87*, pp. 756–763, 1987.

Journal article entitled "An Integrated Appraoch to Switched Reluctance Motor Design", by C. Pollock and B. W. Williams, pp. 865–870.

"Dynamic Operation", by T.J.E. Miller, Switched Reluctance Motors and their Control, pp. 53–71, 1993.

"Power Electronic Controller", by T.J.E. Miller, Switched Reluctance Motors and their Control, pp. 85–97, 1993.

*Primary Examiner*—Paul Ip
*Attorney, Agent, or Firm*—Arter & Hadden LLP

[57] ABSTRACT

A circuit for controlling the operation of switched reluctance machines (i.e., motor or generator) having a plurality of phase windings. The circuit slows down the initial "turn off" of the phase windings to eliminate an abrupt reduction in the current flowing therethrough. This reduces the impulse which excites mechanical oscillations in the motor/generator, reduces switching losses in the switching transistors, and reduces the number of harmonics.

31 Claims, 3 Drawing Sheets

SOFT TURN-OFF CONTROLLER FOR SWITCHED RELUCTANCE MACHINES

FIELD OF THE INVENTION

The present invention generally relates to a controller or power switching circuit for exciting switched reluctance machines, and more particularly relates to a circuit for exciting switched reluctance machines, wherein the circuit provides a soft turn-off for each phase excitation.

BACKGROUND OF THE INVENTION

A reluctance motor is an electric motor in which torque is produced by the tendency of its moveable part to move to a position where the inductance of the excited winding is maximized. The motion may be rotary or linear, and the rotor may be interior or exterior. The "winding" usually consists of a number of electrically separate circuits or phases. In a motoring operation, each phase is usually excited when its inductance is increasing, and is unexcited when its inductance is decreasing. The opposite is true for a generating operation. The reluctance motor is a fully controlled variable speed drive system, when powered from a suitable power converter circuit. It is capable of producing high torque at low speeds, thus making it particularly well suited for use in traction and other industrial applications. The reluctance motor is also useful in applications requiring a motor that must operate at high speeds.

A switched reluctance (SR) motor is a doubly salient motor. In this regard, both the stator and the rotor have salient poles. A coil, wound around each stator pole is connected with the coil on the diametrically opposite stator pole to form a phase winding. The reluctance of the flux path between the two diametrically opposite stator poles varies as a pair of rotor poles move in and out of alignment. Because inductance is inversely proportional to reluctance, the inductance of the phase is a maximum when the rotor is in the aligned position, and a minimum in the non-aligned position. A pulse of positive torque (i.e., motoring torque) is produced if current flows in a phase winding as the inductance of that winding is increasing. A negative torque (i.e., generating torque) contribution is avoided if the current is reduced to zero before the inductance starts to decrease again.

A controller is desired which can increase and decrease the current in a phase winding as fast as possible. However, it has been observed that abrupt decreases in the current in a phase winding at "turn off," causes mechanical oscillations in the motor, which makes for noisy motor operation. Moreover, abrupt changes in the current (i.e., "hard" inductive switching), leads to switching losses in the associated switching device (e.g., commutation transistor), which may result in lower efficiency and higher operating temperatures. The higher operating temperatures lead to a shortened life for the switching device. In addition, there are significant harmonics generated in response to the sudden change in current. Accordingly, there is a need for a controller which can rapidly, but less abruptly, decrease the current in a phase winding.

SUMMARY OF THE INVENTION

According to the present invention there is provided a controller for exciting switched reluctance (SR) machines, wherein the controller provides a soft turn-off at the conclusion of each phase excitation.

An advantage of the present invention is the provision of a controller for an SR machine, which provides a gradual transition in current at "turn off" in a phase winding, without the use of sophisticated and complex circuitry.

Another advantage of the present invention is the provision of a controller for an SR machine, which abates noise during operation of the SR motor by reducing the excitation mechanical oscillations of the motor "frame."

Still another advantage of the present invention is the provision of a controller for an SR machine, which reduces "turn-off" switching losses in an associated switching device.

Still another advantage of the present invention is the provision of a controller for an SR machine, which reduces harmonics generated in response to the sudden change in current in the phase windings.

Yet another advantage of the present invention is the provision of a controller for an SR machine, which reduces generation and propagation of electromagnetic interference (EMI).

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
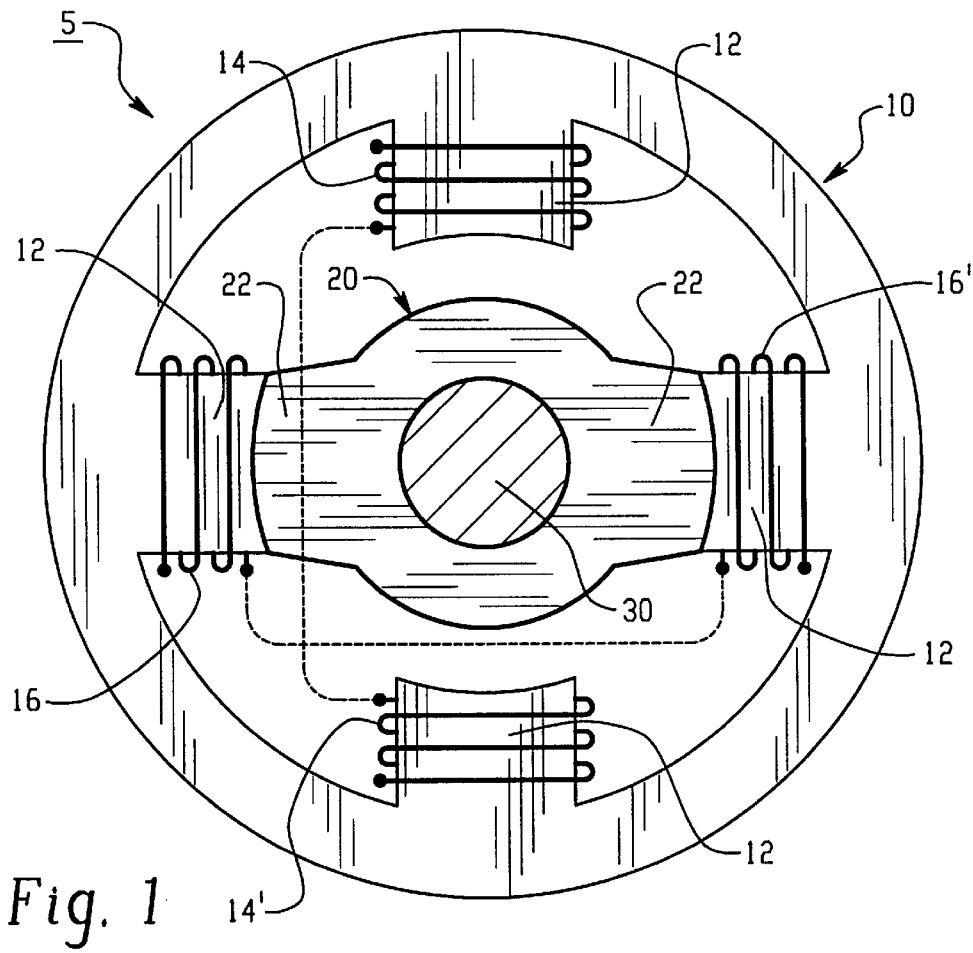
FIG. 1 illustrates an exemplary two phase switched reluctance motor.

Referring now to the drawings wherein the showings are for the purposes of illustrating a preferred embodiment of the invention only and not for purposes of limiting same, FIG. 1 illustrates an exemplary two phase switched reluctance (SR) motor 5. It should be appreciated that the term "switched reluctance," as used herein, is also intended to refer to "variable reluctance" and "synchronous reluctance." Moreover, while the present invention is described with particular reference to a switched reluctance motor, the present invention is equally applicable to a switched reluctance generator.

Motor 5 is generally comprised of a stator 10 and a rotor 20. Stator 10 includes stator poles 12. Each stator pole 12 is surrounded by a winding of one or more turns of electrically conductive material and appropriate insulation. Each phase winding is a pair of series (or parallel) connected windings respectively wound on diametrically opposed stator poles 12. Accordingly, windings 14 and 14' form a first phase winding ("phase A"), while windings 16 and 16' form a second phase winding ("phase B").

The phase A and phase B windings are grouped together so that a balanced torque is produced in the motor when the windings are excited from an external source of electrical energy and also so that voltage and current requirements of the external energy source are satisfied. A variation in reluctance occurs when rotor 20 is rotated with respect to stationary stator poles 12. The variation in reluctance is the result of the variation in the inductance of the phase windings. Minimum inductance is observed when rotor poles 22 are at right angles to stator poles 12. This point in rotational space is commonly referred to as an "unaligned position." The unaligned position in most SR motors typically exists throughout an arc of several degrees of rotor rotation. Moreover, the inductance of the respective phase winding is nearly constant at its minimum value throughout this arc. Excitation of the respective phase windings during this rotational period of constant, minimum inductance results in negligible developed torque.

As rotor 20 turns beyond the arc of minimum inductance, the inductance in the respective phase windings begins to increase. It reaches a maximum value when a pair of rotor and stator poles are aligned. This position is commonly referred to as the "aligned position." In FIG. 1, rotor 22 is aligned with stator poles 12 associated with windings 16 and 16'. When the respective phase winding is excited with an electrical current as the inductance is increasing from minimum to maximum, a motor torque is developed on shaft 30. In contrast, when the respective phase winding is excited as the inductance is decreasing from a maximum to a minimum, torque of the opposite direction is developed on shaft 30 (i.e., generator torque).

The switching or "excitation" of the phase windings is typically accomplished by solid state switching devices such as MOSFETs, transistors, thyristors, insulated gate bipolar transistors (IGBTs) and the like, including combinations thereof. The sequencing of the solid state switching devices is typically determined by a "logic system" comprised of electronic circuits, that are responsive to various sensors which sense parameters such as voltage levels, current levels in the windings, the position of the rotor poles relative to the stator poles, or other signals necessary for proper operation of the motor.

Figure 2:
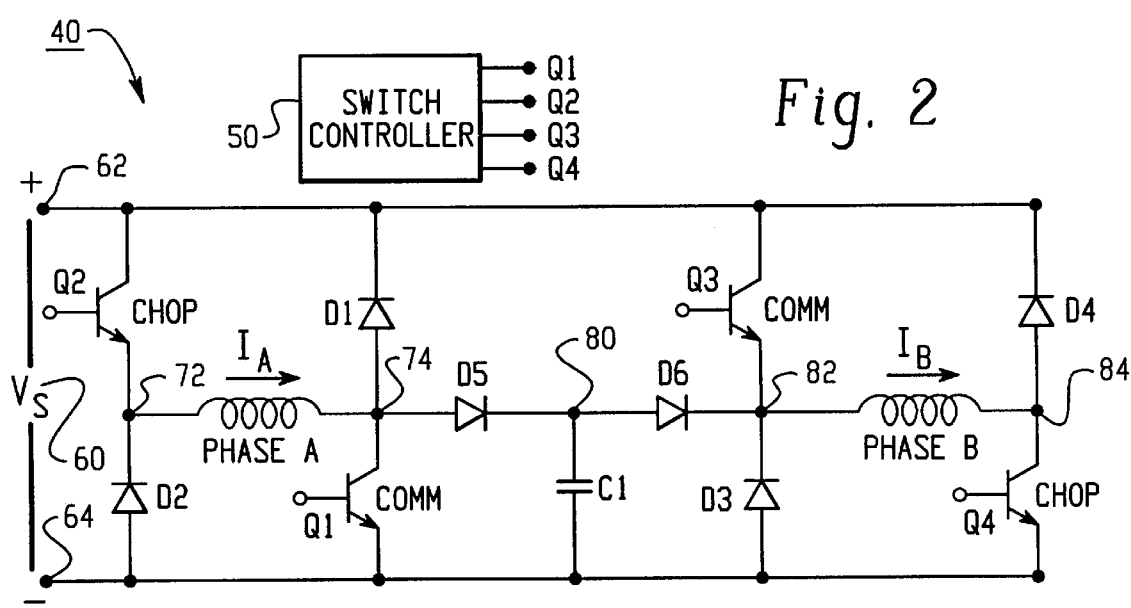
FIG. 2 is a schematic of a controller for unipolar excitation of a two phase switched reluctance (SR) motor, in accordance with the present invention.

FIG. 2 illustrates a controller 40 for driving a 2-phase SR motor. It should be appreciated that controller 40 may also be referred to as a power switching circuit. In accordance with a preferred embodiment, controller 40 is generally comprised of a pair of controller circuits in the form of asymmetric half bridges (AHB). The asymmetric half bridges are both connected to a capacitive circuit, which is described in detail below. It should be appreciated that the controller circuit may take a form other than an AHB, as will be discussed below.

The first asymmetric half bridge (AHB) is comprised of a phase winding A, a commutation switch Q1, a chopping switch Q2, and a pair of freewheeling diodes D1 and D2. The second asymmetric half bridge is comprised of a phase winding B, a commutation switch Q3, a chopping switch Q4, and freewheeling diodes D3 and D4. The capacitive circuit is comprised of a pair of diodes D5 and D6, and a capacitor C1.

A DC energy source (supply voltage Vs) provides a source of electrical energy to controller 40. Phase windings A and B are respectively connected between a positive potential 62 and a negative potential 64 of supply voltage Vs by closing of switches Q1–Q4 and diodes D1–D4. It should be understood that while switches Q1, Q2, Q3, and Q4 are shown as power transistors, other appropriate types of power switching devices are also suitable.

The primary function of switches Q1 and Q3 (commutation transistors) is to enable the respective phase windings, while the primary function of switches Q2 and Q4 (chopping transistors) is to regulate current in the respective phase windings, during the period that the respective phase winding is excited. It should be appreciated that the inverted functional arrangement of Q3 and Q4 (i.e., chopping switch-for-commutation switch), as compared to Q1 and Q2, is important to operation of the present invention, as will be apparent from the detailed description provided below.

A switching controller 50 generates control signals to control the switching of switches Q1, Q2, Q3 and Q4. The control signals are generated in accordance with prior art techniques and may be in response to sensor signals, preprogrammed signals (e.g., stored in ROM), manually-controlled signals, or a combination thereof. The design of switch controller 50 does not form a part of the present invention, except that it must be capable of operating switches Q1, Q2, Q3 and Q4 to provide appropriate current pulse control. It should be appreciated that the sequence of current flow for each phase winding may take many suitable forms, including sequential or overlapping. In sequential operation, current flows through only one phase winding at a time. In overlapping operation, current may simultaneously flow through two or more phase windings.

Controller 40 generally has three basic modes of operation for current control, namely, a positive voltage loop (PVL), a zero voltage loop (ZVL) and a negative voltage loop (NVL). PVL occurs when both switches for a phase winding are closed. During the PVL mode, the current in the respective phase winding will generally increase.

ZVL occurs when either one of the two respective switches for a phase is open (i.e., OFF). During the ZVL mode the phase or winding current can continue to freewheel through one of the two respective diodes for a phase. With ideal circuit components, the current in the respective phase winding is maintained due to the lossless short circuit across the phase winding. However, with practical circuit components and mechanical power taken from the shaft, the current in the respective phase winding will slowly decay. As a result, a ZVL mode is usually alternated with a PVL mode to maintain the current in the respective winding at a desired level. To maintain the current in phase winding A, Q1 remains closed while Q2 (chopping transistor) is toggled between open (i.e., OFF) and closed (i.e., ON) to alter the current path. As a result, the current in phase winding A is "chopped" to maintain a constant magnitude. Likewise, the current in phase winding B is maintained by keeping Q3 closed while Q4 (chopping transistor) is toggled between open and closed.

Lastly, in the NVL mode, both of the respective switches for a phase are opened (i.e., "turned OFF"), and current rapidly falls as energy is returned from the respective phase winding to the supply voltage via the respective pair of diodes. The present invention initially slows this rapid decay to avoid an abrupt change in applied terminal voltage, as will be explained in detail below.

As indicated above, an abrupt turn off of the phase switching devices at the end of each phase excitation cycle causes a rapid decay in phase current as the negative voltage loop (NVL) is encountered. The large voltage into which the current must "buck" causes the above mentioned problems. The present invention provides a controller which causes a more gradual transition in current without the need for sophisticated and complex circuitry.

Operation of controller 40 will now be described in detail with reference to FIG. 2. It should be understood that initially there is no voltage across C1. To begin phase A excitation, switches Q1 and Q2 are switched ON. As a result, the positive terminal 62 of DC energy source 60 is connected to terminal 72 of phase winding A, and the negative terminal 64 of DC energy source 60 is connected to terminal 74 of phase winding A. Diodes D1, D2 and D5 are reverse biased. Accordingly, a supply voltage Vs is applied to the inductors comprising phase winding A in a positive voltage loop (PVL). This results in a general increase in the phase A current. Current flows in the following loop: phase winding A - switch Q1 - supply voltage Vs - switch Q2. It should be noted that as the rotor progresses toward full alignment with the stator, the back EMF of the motor will detract from the available voltage of the energy source. As a result, the rate of current rise may decrease, or even change direction (i.e., the current may actually begin to fall).

When the desired peak current level is reached, switch Q2 is turned OFF, while switch Q1 remains ON. As a result, the potential at terminal 72 drops below the potential at terminal 64, and freewheeling diode D2 becomes forward biased. Accordingly, terminal 72 is connected to negative terminal 64 through diode D2. Since switch Q1 remains ON, terminal 74 is also connected to negative terminal 64. Therefore, the inductors comprising phase winding A are short circuited in a zero voltage loop (ZVL). The current continues to "freewheel" in the following loop: phase winding A -switch Q1 - diode D2.

As indicated above, the phase A current slowly decays as some energy is dissipated in the resistance of the windings, conduction losses in the switch and diode, and some electrical energy is converted to mechanical energy. To maintain the desired current level in phase winding A for the desired duration, switch Q2 is toggled between ON and OFF, as necessary. When switch Q2 is ON, the circuit returns to the PVL mode, whereas, when switch Q2 is OFF, the circuit returns to the ZVL mode. The changes in the phase A current are observed as ripples in FIG. 3B (period T3), which is explained in further detail below.

When it is the appropriate time to decrease the phase A current to zero (i.e., conclude the excitation of phase A), switches Q1 and Q2 are both turned OFF. As a result, the potential at terminal 74 tries to become positive relative to the potential at terminal 80 of capacitor Cl. Thus, diode D5 becomes forward biased. As noted above, the initial voltage across capacitor C1 is zero. At the instance that switches Q1 and Q2 are opened, current in the inductors comprising phase winding A begins flowing through diode D5 to capacitor Cl and back through diode D2 (i.e., the loop: phase winding A diode D5—capacitor C1—diode D2). Therefore, the current flow initially looks like a ZVL, when the charge on capacitor C1 is low, and progresses to a NVL, as capacitor C1 continues to charge to the supply voltage Vs. At full charge of capacitor C1, the circuit looks just like a diode-clamped asymmetric half bridge. It will be appreciated that the capacitor-induced ZVL current flow results in an initially slowed decay of the current in the inductors comprising phase winding A.

Upon capacitor C1 becoming filly charged, terminal 74 goes positive relative to terminal 62, causing diode D1 to become forward biased, and diode D5 to become reverse biased. Consequently, any current remaining in the inductors comprising phase winding A begins flowing in a final NVL as follows: phase winding A—diode D1—supply voltage Vs—diode D2. It should be noted that when the voltage across C1 is the same as the supply voltage Vs, diode D5 could be referred to as "unbiased." In this regard, unless there is sufficient voltage across the diode to overcome it's intrinsic "forward voltage," then current will not be "compelled" to flow, even though the anode might be some fraction of a volt more positive than the cathode.

This final NVL leads to a rapid decay in the current of phase winding A to zero. Eventually, the energy in the inductor is filly depleted and terminal 74 goes negative relative to terminal 62, causing diode D1 to become reversed biased. Simultaneously, terminal 72 becomes more positive than terminal 64 and diode D2 becomes reverse biased (i.e., stops conducting). Therefore, when the current in phase winding A reaches zero, both diodes D1 and D2 are reverse biased, thus disconnecting phase winding A from the circuit.

To begin the subsequent excitation of the phase B winding, switches Q3 and Q4 are turned ON. It should be understood that diode D6 will always be reverse biased whenever switch Q3 is ON. As a result of switches Q3 and Q4 being closed, the supply voltage Vs is applied across phase winding B. Therefore, current flows in a PVL as follows: phase winding B - switch Q4 - supply voltage Vs - switch Q3. Consequently, the current in the inductors comprising phase winding B will increase.

When the desired peak current level is reached, chopping switch Q4 is turned OFF. As a result, terminal 84 will be forced, by the inductive nature of phase winding B, to have a higher potential than terminal 62, thus causing diode D4 to become forward biased. Thus, the inductors comprising phase winding B are short circuited in a ZVL consisting of: phase winding B - diode D4 - switch Q3. This results in a gradual decay in the phase B current. To maintain the current for the desired duration, switch Q4 is toggled between ON and OFF. When switch Q4 is ON, the circuit is in the PVL mode, and when switch Q4 is OFF, the circuit is in the ZVL mode.

When it is the appropriate time to decrease the phase B current to zero, switches Q3 and Q4 are both turned OFF. As a result, diode D6 and diode D4 become forward biased. It is noted that capacitor C1 remains charged from the Phase A turn-off. At the instant that switches Q3 and Q4 are opened, a ZVL effect is provided. In this regard, current in the inductors comprising phase winding B flows as follows: phase winding B - diode D4 - supply voltage Vs - capacitor C1 - diode D6. It should be noted that capacitor C1 and diode D6 clamp terminal 82 of phase winding B. In this regard, capacitor C1 initially provides its current to phase winding B. As capacitor C1 discharges towards ground, the circuit gradually moves from a ZVL mode to a NVL mode. When capacitor C1 reaches ground (i.e., fully discharged), diode D3 becomes forward biased, forming a full NVL as follows: phase winding B - diode D4 - supply voltage Vs—diode D3. When the current in phase winding B reaches zero diodes D3 and D4 become reverse biased, thus disconnecting phase winding B from the circuit. Capacitor C1 is now in proper condition (i.e., fully discharged) for use in the soft "turn off" of the subsequent phase A excitation.

It should be appreciated that since the alternate bridge for phase winding B is "flipped" (i.e., chopping switch-for-commutation switch), the voltage stored at capacitor C1 after phase winding A "turn-off" is in the correct sense to act as a soft turn-off when commutation switch Q3 is opened at the end of phase winding B excitation. The cycle repeats without the need to introduce additional circuitry to manage energy storage on capacitor C1. In this regard, each phase "turn-off" takes care of energy storage management without the need for additional circuitry.

Figure 3A:
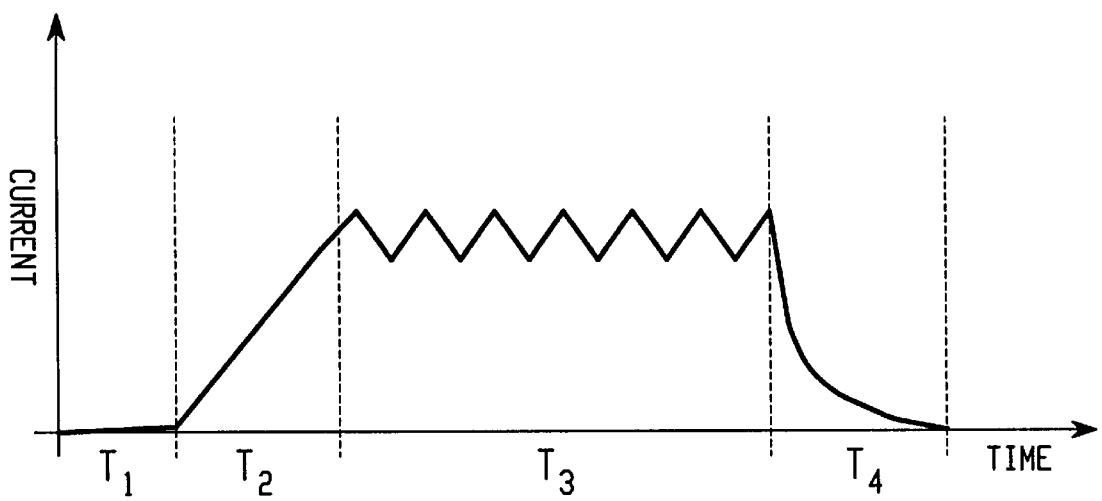
FIG. 3A is a current waveform obtained in connection with use of prior art controllers.

FIG. 3A illustrates a current waveform for a phase winding in accordance with prior art controllers. During period T1 there is no current in the phase winding. During period T2, the amount of current flowing in the phase winding is increasing. This results from a PVL mode. During period T3, the amount of current flowing in the phase winding is maintained. This results from alternating between a PVL mode and a ZVL mode. During period T4 (i.e., "turn off"), the amount of current flowing in the phase winding begins decreasing to zero. This results from a NVL mode. It is important to note that there is an abrupt change in the current (i.e., a high di/dt) as soon as period T4 begins.

Figure 3B:
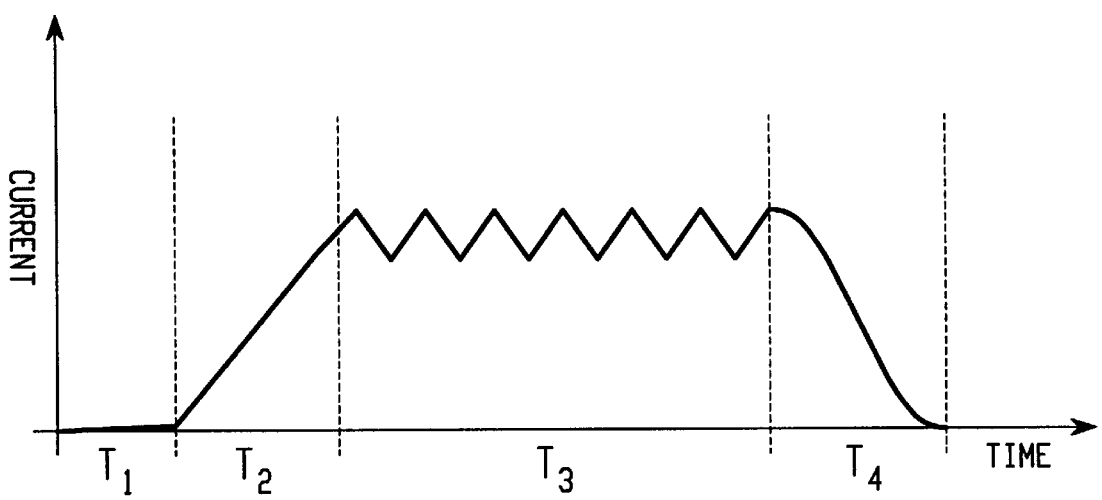
FIG. 3B is a current waveform obtained in connection with use of the present invention.

The present invention addresses the abrupt change in current, as can be seen from FIG. 3B, which is the current waveform for the controller of the present invention. As can be seen, periods T1, T2 and T3 in FIG. 3B are the same as seen in FIG. 3A. However, in FIG. 3B the current waveform begins period T4 with a rounded corner (i.e., a lower di/dt), rather than the abrupt drop, seen in FIG. 3A. The rounded corner is the result of the initial ZVL preceding the NVL, as described above. It should be appreciated that after the initial rounded corner, the di/dt in the later part of period T4 is essentially the same as seen in FIG. 3A. This occurs because capacitor C1 beginning to charge (phase A) or discharge (phase B). Accordingly, the phase winding current reaches zero at approximately the same time in both FIGS. 3A and 3B.

Figure 4:
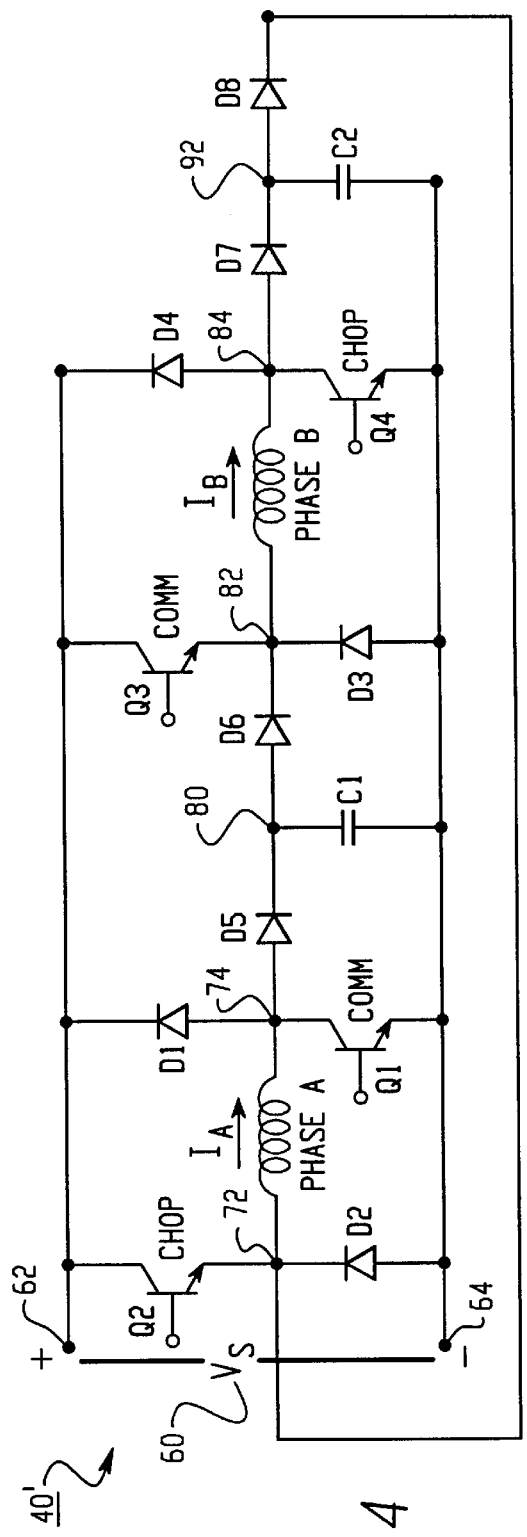
FIG. 4 is a schematic of a controller for unipolar excitation of a two phase switched reluctance (SR) motor, in accordance with an alternative embodiment of the present invention.

Referring now to FIG. 4, there is shown a controller 40', which is particularly effective for use in a "single pulse mode." Single pulse mode refers to the operating condition wherein modulation of the chopping transistor's ON-time is not required to effect current amplitude limiting. This typically occurs during high speed operation, but can also be extended into the domain of low speed operation (albeit at reduced torque levels) by using "dwell control." With dwell control, the duration of switch conduction is limited to only that which is necessary to generate the required torque while adhering to the maximum allowable current levels. Although the torque ripple will be higher in dwell controlled motors, the switching losses will be minimized by having only a single turn-on/turn-off cycle per phase firing.

It should be further understood that single pulse mode can be promoted at low speeds by moderating the DC supply potential to an appropriate level in keeping with desired speed and torque requirements. Regardless of cause, single pulse mode allows for both the commutation and chopping transistors to be turned ON for the entire phase firing interval. There is no alternation between PVL and ZVL (as in soft-chopping) or PVL and NVL (as in hard chopping).

One benefit of operating in single pulse mode is that switching losses in the power switches is minimized. Moreover, the circuit shown in FIG. 4 offers the added benefits that turn-off losses in switches Q1–Q4 are further reduced by establishing a soft turn-off, and that turn-off losses normally associated with diodes D1–D4 are distributed across diodes D5–D8 as well.

Controller 40' shown in FIG. 4 works essentially the same as the circuit of FIG. 2, but having an additional soft turn-off network for switches Q4 and Q2. The soft turn-off network is comprised of diode D7 (added between terminals 84 and 92), diode D8 (added between terminals 92 and 72), and a second capacitor C2 (added between terminals 92 and 64). However, it should be noted that capacitor C2 will not be correctly "pre-charged" for desired soft-turn-off operation until the motor/drive enters the single pulse mode of operation. This is because any chopping action will serve to prematurely alter the charge on capacitor C2 (thus degrading the "softness" of any turn-off at the end of the phase firing). Fortunately, the circuit does not interfere with normal chopping.

To apply the present invention to an SR motor having a greater number of "even" phases, controllers of FIGS. 2 and 4 are replicated for each additional pair of phase windings. Moreover, while the present invention has been described with reference to a switched reluctance machine having an even number of phases, the present invention may be suitably modified for use with a switched reluctance machine having an odd number of phases by adding an auxiliary energy management circuit to manage the soft turn-off capacitor for the "un-paired" phase.

Figure 5:
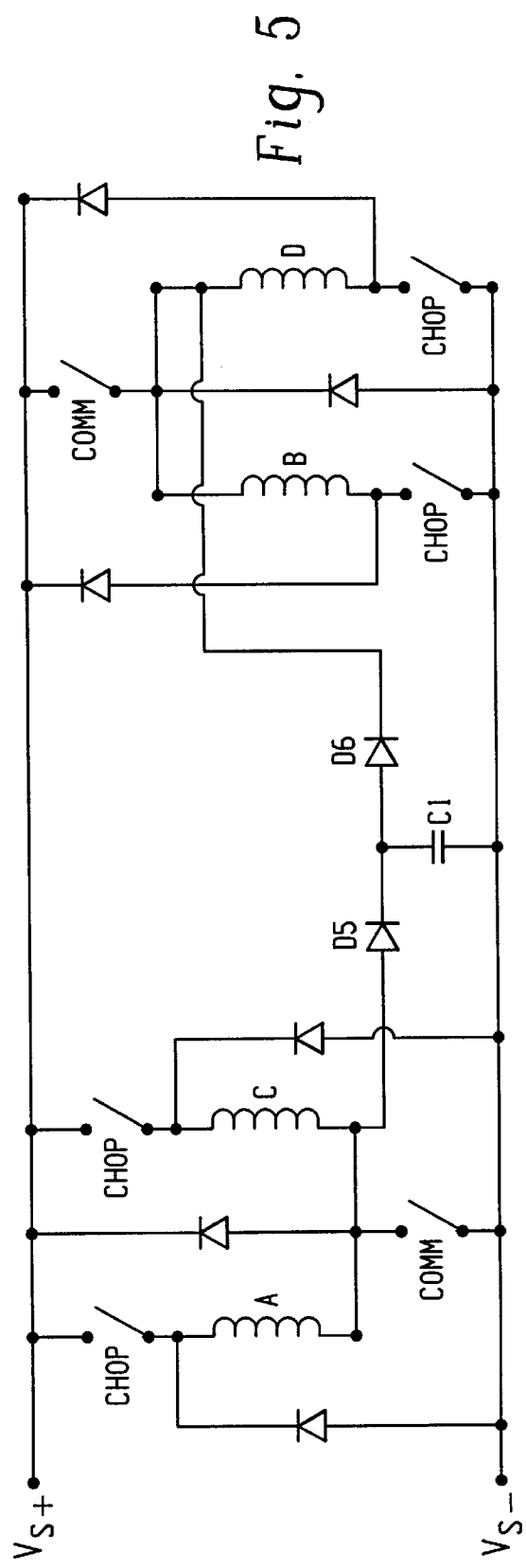
FIG. 5 is a schematic of a controller having a shared commutation switch, which incorporates the present invention.

It will be appreciated that the present invention finds application in a wide variety of controller designs. As mentioned above, the controller circuit may take many forms. For instance, in FIG. 5 there is shown a controller which is comprised of controller circuits including a pair of phase windings and three switching devices (i.e., two chopping switches and one shared commutation switch). The soft turn-off is provided by the capacitive circuit comprised of capacitor C1 and diodes D5 and D6.

As indicated above, the present invention has numerous advantages. In the absence of capacitor C1, the change in voltage across the phase winding inductors will be controlled solely by the switching speed of the semiconductor switches. Capacitor C1 moderates the rate of rise in voltage across the phase winding inductors, in accordance with the well known relationship $dv/dt=i/c$. Accordingly, the "rise time" for the voltage will increase, which in turn reduces the high frequency components. Reducing the high frequency components has the beneficial effects of reducing both electrical and mechanical impulses. Reductions in electrical impulses leads to reductions in turn-off losses, while reductions in mechanical impulses leads to reductions in acoustic noise. It will be appreciated that reduction of turn-off losses is particularly advantageous in motors operating at high RPM. Another benefit of reducing high frequency components is the reduction in potential generation and subsequent propagation of electromagnetic interference (EMI), since EMI radiates more easily with higher frequency components.

The invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. A controller for controlling the flow of current in a switched reluctance machine comprising:
   first and second controller circuits, each said first and second controller circuits including:
   a phase winding associated with a phase of the switched reluctance machine,
   a commutation switch and a chopping switch for initiating modifications in the flow of current in the phase winding, and
   first and second freewheeling diodes associated with the phase winding;

a capacitive circuit connected with said first and second controller circuits including:
   a capacitor having a first terminal and a second terminal,
   a first diode for carrying current to charge said capacitor, and
   a second diode for carrying current to discharge said capacitor; and
a DC power supply for providing a supply voltage to the first and second controller circuits, the DC power supply having a first DC potential and a second DC potential.

2. A controller according to claim 1, wherein said first diode has a first terminal connected to the first controller circuit and a second terminal connected to the first terminal of the capacitor.

3. A controller according to claim 2, wherein said second diode has a first terminal connected to the first terminal of the capacitor and a second terminal connected to the second controller circuit.

4. A controller according to claim 2, wherein said second terminal of said capacitor is connected to the second DC potential.

5. A controller according to claim 1, wherein current flows in a positive voltage loop, including said phase winding of said first controller circuit, said commutation switch of said first controller circuit, said supply voltage, and said chopping switch of said first controller circuit, when said commutation and chopping switches of said first controller circuit are closed at initiation of excitation of said phase winding of said first controller circuit.

6. A controller according to claim 1, wherein current flows in a zero voltage loop, including said phase winding of said first controller circuit, said commutation switch of said first controller circuit, and said second freewheeling diode of said first controller circuit, when a desired peak current has been reached during excitation of said phase winding of said first controller circuit.

7. A controller according to claim 1, wherein said capacitor begins charging when said commutation and chopping switches of the first controller circuit are opened at conclusion of excitation of said phase winding of said first controller circuit.

8. A controller according to claim 7, wherein current initially flows in a zero voltage loop, including said phase winding of said first controller circuit, said first diode, said capacitor and said second freewheeling diode of said first controller circuit, when said commutation and chopping switches of said first controller circuit are initially opened at the conclusion of excitation of said phase winding of said first controller circuit.

9. A controller according to claim 8, wherein current flows in a negative voltage loop, including said phase winding of said first controller circuit, said first diode, said capacitor and said second freewheeling diode of said first controller circuit, as the capacitor charges to the supply voltage.

10. A controller according to claim 9, wherein current flows in a negative voltage loop, including said phase winding of said first controller circuit, said first freewheeling diode of said first controller circuit, said supply voltage and said second freewheeling diode of said first controller circuit, when the charge on said capacitor exceeds the charge at the first terminal of said first diode.

11. A controller according to claim 1, wherein current flows in a positive voltage loop, including said phase winding of said second controller circuit, said chopping switch of said second controller circuit, said supply voltage, and said commutation switch of said second controller circuit, when said commutation and chopping switches of said second controller circuit are closed at initiation of excitation of said phase winding of said second controller circuit.

12. A controller according to claim 1, wherein said capacitor begins discharging when said commutation and chopping switches of said second controller circuit are both opened after excitation of said phase winding of said second controller circuit is completed.

13. A controller according to claim 12, wherein current flows in a zero voltage loop, including said phase winding of said second controller circuit, said first freewheeling diode of said second controller circuit, and said commutation switch of said second controller circuit, when a desired peak current has been reached during excitation of said phase winding of said second controller circuit.

14. A controller according to claim 12, wherein current initially flows in a zero voltage loop, including said phase winding of said second controller circuit, said first freewheeling diode of said second controller circuit, said supply voltage, said capacitor and said second diode, when said commutation and chopping switches of said second controller circuit are initially opened at conclusion of excitation of said phase winding of said second controller circuit.

15. A controller according to claim 14, wherein current flows in a negative voltage loop, including said phase winding of said second controller circuit, said first freewheeling diode of said second controller circuit, said supply voltage, said capacitor, and said second diode, as said capacitor is discharging.

16. A controller according to claim 15, wherein current flows in a negative voltage loop, including said phase winding of said second controller circuit, said first freewheeling diode of said second controller circuit, said supply voltage and said second freewheeling diode of said second controller circuit, when said capacitor is fully discharged.

17. A controller according to claim 1, wherein:
   a switch controller provides control signals to said commutation and chopping switches of said first and second controller circuits.

18. A controller according to claim 1, wherein said commutation and chopping switches of said first and second controller circuits are transistors.

19. A controller according to claim 1, wherein said controller includes a plurality of said first and second controller circuits and said capacitive circuits, wherein each said first and second controller circuits and said capacitive circuits controls current in a different pair of phase windings.

20. A controller according to claim 1, wherein said controller further comprises a second capacitive circuit connected with said first and second controller circuits, the second capacitive circuit including:
   a second capacitor having a first terminal and a second terminal,
   a third diode for carrying current to charge the second capacitor, and
   a fourth diode for carrying current to discharge the second capacitor.

21. A controller according to claim 20, wherein said third diode has a first terminal connected to the second controller circuit and a second terminal connected to the first terminal of the second capacitor.

22. A controller according to claim 21, wherein said fourth diode has a first terminal connected to the first terminal of the second capacitor and a second terminal connected to the first controller circuit.

23. A controller according to claim 21, wherein said second terminal of the second capacitor is connected to the second DC potential.

24. A controller according to claim 1, wherein said first and second controller circuits are asymmetric half bridges (AHB).

25. A circuit for controlling the flow of current in a switch reluctance machine comprising:
- a first phase winding having first and second terminals;
- a first switch having a first terminal for connection to a first DC potential, a second terminal connected to the second terminal of the first phase winding and a control terminal for controlling turning on and off of the first switch;
- a second switch having a first terminal for connection to a second DC potential, a second terminal connected to the first terminal of the first phase winding and a control terminal for controlling turning on and off of the second switch;
- a first freewheeling diode having a first terminal connected to the second terminal of the first phase winding and a second terminal connected to the second DC potential;
- a second freewheeling diode having a first terminal connected to the first DC potential and a second terminal connected to the first terminal of the first phase winding;
- a first diode having first and second terminals, the first terminal of the first diode connected to the second terminal of the first phase winding; and
- a capacitor having first and second terminals, wherein said first terminal of the capacitor and the second terminal of the first diode are connect together at a common node, and the second terminal of the capacitor is connected to the first DC potential.

26. A circuit according to claim 25, wherein said circuit further comprises:
- a second phase winding having first and second terminals;
- a third switch having a first terminal for connection to the second DC potential, a second terminal connected to the first terminal of the second phase winding and a control terminal for controlling turning on and off of the third switch;
- a fourth switch having a first terminal for connection to the second terminal of the second phase winding, a second terminal for connection to the first DC potential, and a control terminal for controlling turning on and off of the fourth switch;
- a third freewheeling diode having a first terminal connected to the first DC potential and a second terminal for connection to the first terminal of the second phase winding;
- a fourth freewheeling diode having a first terminal for connection to the second terminal of the second phase winding and a second terminal for connection to the second DC potential; and
- a second diode having first and second terminals, the first terminal of the first diode connected to said common node, and the second terminal of the first diode connected to the first terminal of the second phase winding.

27. A circuit according to claim 26, wherein said circuit further comprises:
- a third diode having first and second terminals, the first terminal of the third diode connected to the second terminal of the second phase winding;
- a second capacitor having first and second terminals, wherein the first terminal of the second capacitor and the second terminal of the third diode are connect together at a common node, and the second terminal of the second capacitor is connected to the first DC potential; and
- a fourth diode having first and second terminals, the first terminal of the fourth diode connected to said common node, and the second terminal of the fourth diode connected to the first terminal of the first phase winding.

28. A circuit according to claim 25, wherein said first DC potential is negative and said second DC potential is positive.

29. A circuit for controlling the flow of current in a switched reluctance machine, comprising:
- a plurality of phase windings;
- a plurality of switching means for respectively controlling flow of current through the plurality of phase windings;
- capacitive circuit means including at least one capacitor, for slowing the decrease in current flowing through the plurality of phase windings upon removal of an external excitation, wherein said at least one capacitor charges to slow the decrease in the current flowing through one of said plurality of phase windings, and the at least one capacitor discharges to slow the decrease in the current flowing through a second of said plurality of phase windings.

30. A method for controlling the flow of current through one or more phase windings at the conclusion of a respective period of external excitation, said method comprising:
- charging a capacitor to form a zero voltage loop to slow the decrease in current flowing through at least one of the phase windings;
  - gradually transitioning from a zero voltage loop to a negative voltage loop to reduce the current flowing through said at least one of the phase windings to zero; and
  - discharging the capacitor to form a zero voltage loop to slow the decrease in current flowing through another of the at least one phase windings; and gradually transitioning from a zero voltage loop to a negative voltage loop to reduce the current flowing through said another of the at least one phase windings.

31. A circuit for controlling the flow of current in a switched reluctance machine, comprising:
- a plurality of switching means for controlling flow of current through a plurality of associated phase windings; and
- a plurality of capacitors for slowing the decrease in current flowing through the plurality of associated phase windings upon removal of an external excitation, wherein said plurality of capacitors charge and discharge to slow the decrease in the current flowing through at least one of the plurality of associated phase windings.

* * * * *